US008483298B2

(12) United States Patent
Ko et al.

(10) Patent No.: US 8,483,298 B2
(45) Date of Patent: Jul. 9, 2013

(54) APPARATUS AND METHOD FOR INITIAL SYNCHRONIZATION IN WIRELESS COMMUNICATION SYSTEM BASED ON OFDM

(75) Inventors: Jae-Yun Ko, Suwon-si (KR); Jae-Hyok Lee, Seoul (KR); Soon-Young Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 402 days.

(21) Appl. No.: 12/777,503

(22) Filed: May 11, 2010

(65) Prior Publication Data

US 2010/0296594 A1    Nov. 25, 2010

(30) Foreign Application Priority Data

May 19, 2009    (KR) ........................ 10-2009-0043473

(51) Int. Cl.
    *H04K 1/10*    (2006.01)
    *H04J 11/00*   (2006.01)
(52) U.S. Cl.
    USPC .......................................... 375/260; 370/210
(58) Field of Classification Search
    USPC ................ 375/260, 262, 265, 354, 365, 367,
                       375/368; 370/208, 210, 509, 514, 515
    See application file for complete search history.

(56) References Cited

U.S. PATENT DOCUMENTS

| 2002/0196731 | A1* | 12/2002 | Laroia et al. | 370/206 |
|---|---|---|---|---|
| 2005/0169408 | A1* | 8/2005 | Kim | 375/343 |
| 2007/0036234 | A1* | 2/2007 | Chen et al. | 375/260 |
| 2010/0118990 | A1* | 5/2010 | Lee et al. | 375/260 |
| 2010/0150181 | A1* | 6/2010 | Lee et al. | 370/503 |

* cited by examiner

Primary Examiner — Young T. Tse
(74) Attorney, Agent, or Firm — Jefferson IP Law, LLP (57) ABSTRACT

An apparatus and a method for acquiring initial synchronization in a wireless communication system based on Orthogonal Frequency Division Multiplexing (OFDM) are provided. The apparatus includes a frame synchronizer for acquiring frame synchronization using a preamble signal, a first offset determiner for determining a first time offset and a first frequency offset based on the frame synchronization, a preamble identifier estimator for estimating a preamble identifier in a receive signal interpolated with the first time offset and the first frequency offset, and a second offset determiner for generating a first preamble signal and a first pilot signal corresponding to the preamble identifier, for derandomizing a preamble signal and a pilot signal, and for determining a second time offset and a second frequency offset. Thus, the initial synchronization acquisition time in a low Signal-to-Noise Ratio (SNR) environment can be reduced.

30 Claims, 5 Drawing Sheets

APPARATUS AND METHOD FOR INITIAL SYNCHRONIZATION IN WIRELESS COMMUNICATION SYSTEM BASED ON OFDM

PRIORITY

This application claims the benefit under 35 U.S.C. §119 (a) of a Korean patent application filed in the Korean Intellectual Property Office on May 19, 2009, and assigned Ser. No. 10-2009-0043473, the entire disclosure of which is hereby incorporated by reference.

BACKGROUND OF THE INVENTION

1. Field of the Invention

The present invention relates generally to a wireless communication system based on Orthogonal Frequency Division Multiplexing (OFDM). More particularly, the present invention relates to an apparatus and a method for acquiring initial synchronization when a receive signal is weak in an OFDM based wireless communication system.

2. Description of the Related Art

Orthogonal Frequency Division Multiplexing (OFDM) technology can not only overcome frequency-selective fading using a simplified equalizer but also exhibits many features such as robustness against impulsive noise and high frequency utilization. As a result of those features, the OFDM technology is employed as core technology of wireless access systems such as the Institute of Electrical and Electronics Engineers (IEEE) 802.16 standard and the 3GPP Long Term Evolution (LTE) standard. However, since signals are simultaneously transmitted over a plurality of subcarriers, time and frequency synchronization errors may greatly degrade the wireless access system performance by causing not only interference between neighbor signals but also interference between the subcarriers. The synchronization errors result in degradation of a handover performance of a terminal. Strict time synchronization and frequency synchronization are required between base stations in order to support seamless handover. For example, when the time synchronization between neighbor cells is poor in a Time Division Duplexing (TDD) based wireless communication system, downlink and uplink may overlap. As a result, the interference between the neighbor cells increases to notably deteriorate communication quality. To address this problem, Worldwide Interoperability for Microwave Access (WiMAX) systems define a base station time error and frequency error within 1% and 1 µs of the subcarrier spacing respectively.

Meanwhile, a method according to the related art utilizes a Global Positioning System (GPS) signal for the synchronization between the base stations. In the WiMAX system based on the IEEE 802.16 standard, each base station acquires the time synchronization and the frequency synchronization using the GPS signal. A GPS synchronizer used at the base station operates only in a region of good signal strength (−130 dBm or greater) received from a GPS satellite. However, a small base station installed indoors suffers from reception performance degradation because of the weak GPS signal strength. To overcome the reception performance degradation, a GPS antenna can be installed outdoors and then connected to the indoor base station using a Radio Frequency (RF) coaxial cable, which results in increased costs. Based on such limitations, to acquire the synchronization of the indoor small base station, consideration is given to a method for acquiring the synchronization based on a sync signal transmitted from the base station which is synchronized with the GPS signal.

The method for acquiring the synchronization based on the sync signal transmitted from the base station which is synchronized with the GPS signal works efficiently when the received signal strength is greater than a certain level (e.g., Signal-to-Noise Ratio (SNR)>−5 dB). In the indoor small base station, when the received signal strength is weak (e.g., SNR=−15 dB), caused by the signal attenuation of the outer wall and the inner wall of the building, noise increase in the cross correlation abruptly extends the initial synchronization acquisition time. When the SNR of the receive signal is high, the SNR decrease from the cross correlation is about 3 dB. When the SNR of the receive signal is quite low, the cross correlation reduces the SNR approximately by double in the dB region. For example, when the SNR of the receive signal is −15 dB, the SNR of the signal after the cross correlation becomes about −30 dB. Herein, to enhance the low SNR of the receive signal, it is necessary to suppress a noise signal by averaging the signal over tens or hundreds of frames. Accordingly, the time for synchronization acquisition increases.

Therefore, a need exists for an apparatus and method for reducing an initial synchronization acquisition time within an allowable time error and an allowable frequency error in a wireless communication system.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for acquiring initial synchronization when a receive signal is weak in a wireless communication system based on Orthogonal Frequency Division Multiplexing (OFDM).

Another aspect of the present invention is to provide an apparatus and a method for reducing an initial synchronization time when a receive signal is weak in an OFDM based wireless communication system.

In accordance with an aspect of the present invention, an apparatus for acquiring initial synchronization in a wireless communication system based on OFDM is provided. The apparatus includes a frame synchronizer for acquiring frame synchronization using a preamble signal, a first offset determiner for determining a first time offset and a first frequency offset based on the frame synchronization, a preamble identifier estimator for estimating a preamble identifier in a receive signal interpolated with the first time offset and the first frequency offset, and a second offset determiner for generating a first preamble signal and a first pilot signal corresponding to the preamble identifier, for derandomizing a preamble signal and a pilot signal, and for determining a second time offset and a second frequency offset.

In accordance with another aspect of the present invention, a method for acquiring initial synchronization in a wireless communication system based on OFDM is provided. The method includes acquiring frame synchronization using a preamble signal, determining a first time offset and a first frequency offset based on the frame synchronization, estimating a preamble identifier in a receive signal interpolated with the first time offset and the first frequency offset, and generating a first preamble signal and a first pilot signal corresponding to the preamble identifier, derandomizing a preamble signal and a pilot signal, and determining a second time offset and a second frequency offset.

In accordance with yet another aspect of the present invention, an apparatus for acquiring initial synchronization in a wireless communication system based on OFDM is provided. The apparatus includes a preamble identifier estimator for extracting a preamble code from a preamble signal contained in a receive signal and for estimating a preamble identifier corresponding to the preamble code, a randomizer for generating a first preamble signal and a first pilot signal using the estimated preamble identifier, and for derandomizing a second preamble signal and a second pilot signal of the receive signal by multiplying the first preamble signal by the second preamble signal and multiplying the first pilot signal and the second pilot signal in the frequency domain, and an offset determiner for determining a time offset and a frequency offset by determining metric values using the derandomized preamble signal and pilot signal in the time domain by applying an Inverse Fast Fourier Transform (IFFT) operation to the derandomized preamble signal and pilot signal.

In accordance with still another aspect of the present invention, a method for acquiring initial synchronization in a wireless communication system based on OFDM is provided. The method includes extracting a preamble code from a preamble signal contained in a receive signal, estimating a preamble identifier corresponding to the preamble code, generating a first preamble signal and a first pilot signal using the estimated preamble identifier, and derandomizing a second preamble signal and a second pilot signal of the receive signal by multiplying the first preamble signal by the second preamble signal and multiplying the first pilot signal and the second pilot signal in the frequency domain, and determining a time offset and a frequency offset by determining metric values using the derandomized preamble signal and pilot signal in the time domain by applying an IFFT operation to the derandomized preamble signal and pilot signal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention provide an apparatus and a method for acquiring initial synchronization when a receive signal is weak in a wireless communication system based on Orthogonal Frequency Division Multiplexing (OFDM).

In the initial synchronization acquisition, to overcome extended synchronization estimation time according to cross correlation caused by a decrease in a Signal-to-Noise Ratio (SNR) of a receive signal, a preamble signal and a pilot signal are generated using an estimated preamble identifier, and a time offset and a frequency offset are estimated by derandomizing the generated preamble signal and pilot signal. According to the Institute of Electrical and Electronics Engineers (IEEE) 802.16 standard, when the preamble identifier is known, it is possible to predict the preamble signal and the pilot signal of a first Partial Usage of SubChannel (PUSC) zone.

While exemplary embodiments of the present invention may be described in the context of a system based on the IEEE 802.16 standard system may be applied in the exemplary embodiments of the present invention for ease of understanding, the present invention is equally applicable to other OFDM based wireless communication systems.

Figure 1:
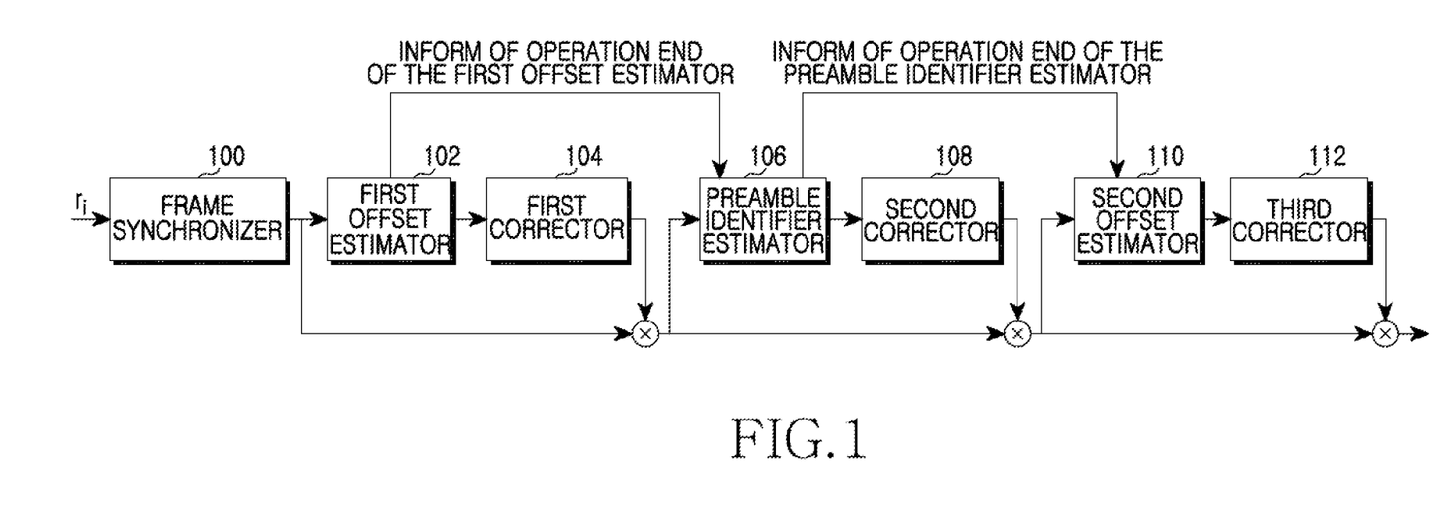
FIG. 1 is a block diagram of an apparatus for acquiring initial synchronization when a receive signal is weak in an Orthogonal Frequency Division Multiplexing (OFDM) based wireless communication system according to an exemplary embodiment of the present invention.

FIG. 1 is a block diagram of an apparatus for acquiring initial synchronization when a receive signal is weak in an OFDM based wireless communication system according to an exemplary embodiment of the present invention. The apparatus may be a terminal or a small base station which synchronizes by receiving a sync signal from a base station.

Referring to FIG. 1, the synchronizing apparatus includes a frame synchronizer 100, a first offset estimator 102, a first corrector 104, a preamble identifier estimator 106, a second corrector 108, a second offset estimator 110, and a third corrector 112.

The frame synchronizer 100 estimates an approximate start point of the frame using a property that the preamble signal in a receive signal $r_i$ is repeated in the time domain. In general, an estimation error is set to be smaller than half of a Cyclic Prefix (CP) or a symbol length.

The first offset estimator 102 estimates an accurate start point of a frame with respect to the receive signal synchronized by the frame synchronizer 100 with the approximate frame start point. That is, the first offset estimator 102 estimates a first time offset and estimates a first frequency offset corresponding to a fractional multiple of a subcarrier spacing using estimated frame start point information. After estimating the time offset and the frequency offset, the first offset estimator 102 finishes its operation and gives notice that the operation has ended.

The first offset estimator 102 determines a metric value to estimate the synchronization based on Equation 1, using the correlation between the receive signal and the receive signal delayed by a Fast Fourier Transform (FFT) in the time domain.

$$c_i(n) = \sum_{m=0}^{i-1} \left( \sum_{l=0}^{N_{cp}-1} r^*(m+1) \cdot N_{sym} + n + l \cdot r(m+1) \cdot N_{sym} + n + l + N_{fft} \right),$$

$$n = -\frac{N_{sym}}{2}, \ldots, \frac{N_{sym}}{2} - 1$$

[Eqn. 1]

In Equation 1, $c_i(n)$ denotes an average metric value during i-ary frames, rn denotes an n-th receive signal (one OFDM symbol includes $N_{sym}=N_{cp}+N_{fft}$-ary sample values), $N_{cp}$ denotes the CP length, $N_{fft}$ denotes an FFT size, and $N_{sym}=N_{cp}+N_{fft}$ is satisfied. That is, the first offset estimator 102 determines a correlation value between the CP interval of the receive signal and the CP interval of the receive signal delayed by the FFT size, over the i-ary frames.

The first offset estimator 102 estimates a location having a maximum metric value among the $N_{sym}$-ary metric values as the frame start point based on Equation 2.

$$\hat{\tau} = \underset{n}{\operatorname{argmax}}(|c_i(n)|)$$

[Eqn. 2]

In Equation 2, n denotes a sample index.

The first offset estimator 102 determines the frequency offset $\hat{f}_o$ using the estimated frame start point $\hat{\tau}$ based on Equation 3.

$$\hat{f}_o = \frac{1}{2\pi} \operatorname{angle}(c_i(\hat{\tau}))$$

[Eqn. 3]

In Equation 3, $c_i(\hat{\tau})$ denotes the maximum metric value among the $N_{sym}$-ary average metric values during the i-ary frames, $\operatorname{angle}(c_i(\hat{\tau}))$ is an angle corresponding to $c_i(\hat{\tau})$, and $\pi$ is the ratio of the circumference of a circle to its diameter.

The first corrector 104 corrects the receive signal using the first time offset and the first frequency offset estimated by the first offset estimator 102.

The preamble identifier estimator 106 shifts the receive signal which is interpolated using the first time offset and the first frequency offset, by the subcarrier spacing, and estimates a second frequency offset corresponding to an integral multiple of the subcarrier spacing. The preamble identifier estimator 106 extracts a preamble code from the preamble signal of the interpolated receive signal, and estimates a preamble identifier corresponding to the preamble code. The second corrector 108 corrects the receive signal using the second frequency offset estimated by the preamble identifier estimator 106.

Meanwhile, the first offset estimator 102 estimates the time offset and the frequency offset using the CP signal similar to the conventional method. While the conventional method accurately estimates the time offset and the frequency offset meeting requirements, an exemplary embodiment of the present invention estimates the time offset and the frequency offset in order to operate the preamble identifier estimator 106. The estimation accuracy of the time offset and the frequency offset required to operate the preamble identifier estimator 106 is about 1/10 of the estimation accuracy of the time offset and the frequency offset required in the conventional method. While the offset estimation accuracy is lower than the conventional method, the time taken for the first offset estimator 102 to estimate the time offset and the frequency offset is shortened. Since the estimation time to meet the same accuracy varies according to a SNR, a method for adaptively regulating the estimation time based on the SNR is provided. That is, the signal corresponding to the preamble location of the receive signal is cross-correlated and then the metric values are generated. When the metric value at a location having the maximum metric value exceeds a certain value, the first offset estimator 102 stops its operation. When the metric value does not exceed the certain value, the same process is repeated in the next frame. For example, the metric value estimated in the i-th frame is expressed in Equation 1.

When the metric value at the estimated location satisfies Equation 4, the first offset estimator 102 estimates the first time offset and the first frequency offset of the corresponding location based on Equation 3 and Equation 4, stops its operation, and gives notice to the preamble identifier estimator 106 that the operation has ended. When Equation 4 is not satisfied, i is increased by 1 in the next frame and the same process is repeated.

$$\operatorname{Conf\_metric} = \frac{|c_i(\hat{\tau})|^2}{\frac{1}{|\Omega_n|} \sum_{k \in \Omega_n} |c_i(k)|^2} \geq \operatorname{Conf\_th1}, \Omega_n$$

$$= \left\{ -\frac{N_{sym}}{2}, \ldots, n - N_{cp}, n + N_{cp}, \ldots, \frac{N_{sym}}{2} - 1 \right\}$$

[Eqn. 4]

In Equation 4, $c_i(\hat{\tau})$ denotes the maximum metric value among the $N_{sym}$-ary average metric values during the i-ary frames, $c_i(k)$ denotes a metric value corresponding to the k-th sample value of the i-ary frames, Conf_th1 denotes a threshold for determining whether to operate the first offset estimator 102, $|\Omega_n|$ denotes the number of elements of $\Omega_n$, $N_{cp}$ denotes the CP length, $N_{fft}$ denotes the FFT size, and $N_{sym}=N_{cp}+N_{fft}$ is satisfied.

The second offset estimator 110 estimates a second time offset and a third frequency offset by derandomizing the receive signal interpolated by the first corrector 104 and the second corrector 108. Accordingly, the second offset estimator 110 generates a preamble signal (i.e., a first preamble signal) and a pilot signal (i.e., a first pilot signal) of the frequency domain using the preamble identifier information estimated by the preamble identifier estimator 106. In the IEEE standard 802.16, when the preamble identifier is known, the preamble signal and the pilot signal of the first PUSC zone may be predicted.

The derandomization is fulfilled by multiplying the receive signal interpolated in the frequency domain by the first preamble signal or the first pilot signal. The second offset estimator 110 is described in more detail with reference to FIG. 2.

The third corrector 112 re-corrects the receive signal compensated by the first corrector 104 and the second corrector 108 using the second time offset and the third frequency offset estimated by the second offset estimator 110.

Figure 2:
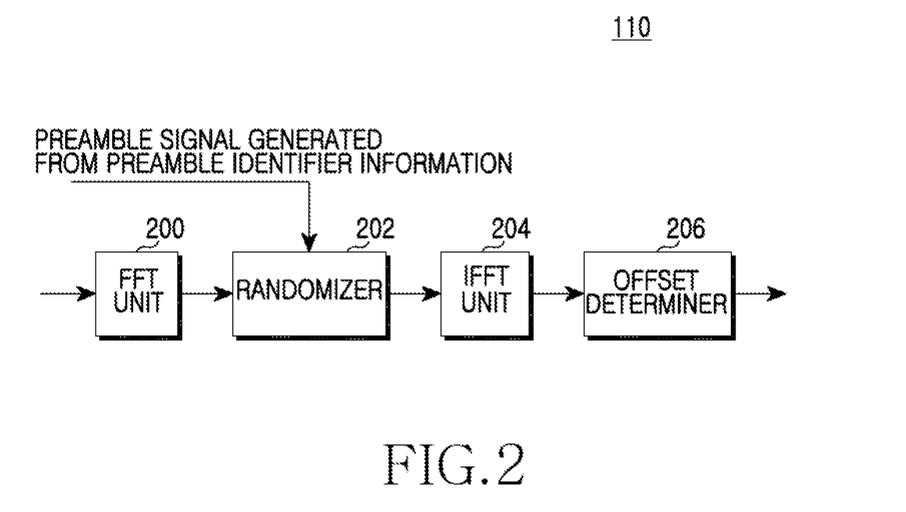
FIG. 2 is a block diagram of a second offset estimator in FIG. 1 according to an exemplary embodiment of the present invention.

FIG. 2 is a block diagram of a second offset estimator in FIG. 1 according to an exemplary embodiment of the present invention.

Referring to FIG. 2, the second offset estimator 110 includes an FFT unit 200, a randomizer 202, an Inverse FFT (IFFT) unit 204, and an offset determiner 206.

The FFT unit 200 performs an FFT operation by receiving sample data of the receive signal interpolated by a first corrector 104 and a second corrector 108, and extracts a preamble signal (i.e., a second preamble signal) and a pilot signal (i.e., a second pilot signal) based on Equation 5.

$$(R_{m,i,1} \cdots R_{m,i,N_{\text{fft}}}) = \text{FFT}(r_{N_{\text{frame}}}^{m+N_{\text{sym}}} \cdots r_{N_{\text{frame}}}^{m+N_{\text{cp}}} \cdots r_{N_{\text{frame}}}^{m+}_{N_{\text{sym}}(i+1)-1}), i=0, \ldots, N_{\text{map}}$$ [Eqn. 5]

In Equation 5, FFT(·) denotes the FFT operation, $N_{\text{frame}}$ denotes the number of samples in the frame duration, $N_{\text{map}}$ denotes the number of OFDM symbols in a MAP duration of the frame, $N_{\text{fft}}$ denotes the FFT size, and m denotes a frame index.

In the frequency domain, the randomizer 202 multiples the first preamble signal by the second preamble signal (see Equation 6), multiples the pilot signal (i.e., the second pilot signal) received in the $N_{\text{map}}$ symbol duration by the first pilot signal (see Equation 7), and thus performs derandomization. The first preamble signal is a frequency-domain preamble signal generated from the estimated preamble identifier information, and the first pilot signal is a frequency-domain pilot signal generated from the estimated preamble identifier information. The second preamble signal is a frequency-domain preamble signal extracted from the receive signal interpolated by the first corrector 104 and the second corrector 108.

$$R'_{m,0,i} = R_{m,0,k} \cdot P_k, k=1, \ldots, N_{\text{fft}}$$ [Eqn. 6]

In Equation 6, $P_k$ denotes a k-th subcarrier signal of the preamble signal corresponding to the estimated preamble identifier, and $R_{m,0,k}$ denotes the preamble signal in the interpolated receive signal. Likewise, the $N_{\text{map}}$ symbol signals received $(R_{m,1,k}, \ldots, R_{m,N_{\text{map}}}^k, k=1, \ldots, N_{\text{fft}})$ after the preamble signal are derandomized as follows.

$$R'_{m,i,k} = R_{m,i,k} \cdot P_k(i), i=1, \ldots, N_{\text{map}}, k=1, \ldots, N_{\text{fft}}$$ [Eqn. 7]

In Equation 7, $p_k(i)$ denotes the pilot signal of the i-th symbol and the k-th subcarrier, and $R_{m,i,k}$ denotes a pilot signal of the MAP interval in the interpolated receive signal.

The IFFT unit 204 IFFT-converts the preamble signal and the pilot signal derandomized from the randomizer 202 to the time-domain signal based on Equation 8.

By IFFT-converting the derandomized preamble signal and pilot signal, signal components spread over the OFDM symbol interval are concentrated to samples of the multipath channel in the time domain. For example, when there is no frequency-selective fading by the multipath, the derandomized preamble signal and the pilot signal have the same value in the frequency domain. Accordingly, the derandomized preamble signal and pilot signal are represented as an impulse signal delayed by the time offset through the IFFT conversion in the time domain. In the actual channel environment, frequency-selective fading exists by the multipath. In this case, the impulse signal is received by dispersing the power to the number of the OFDM symbols in the MAP interval of the multipath frame. Using the multipath receive signal of the greatest signal strength, the time and frequency offsets may be estimated efficiently, which the receive signal of a low SNR to be converted into the receive signal of a high SNR.

$$(y_{m,i,0} \cdots y_{m,i,N_{\text{fft}}}) = \text{IFFT}(R'_{m,i,1} \cdots R'_{m,i,N_{\text{fft}}}), i=0, \ldots, N_{\text{map}}$$ [Eqn. 8]

In Equation 8, IFFT(·) denotes the IFFT operation.

The offset determiner 206 generates a timing metric using the derandomized preamble signal and pilot signal IFFT-converted, based on Equation 9.

$$c_{\text{timing}}(k) = \sum_{m=0}^{M-1} |y_{m,0,k}|^2, k=0, \ldots, N_{\text{fft}}-1$$ [Eqn. 9]

In Equation 9, $y_{m,0,k}$ denotes the time-domain preamble signal converted using the IFFT, m denotes the frame index, $N_{\text{fft}}$ denotes the FFT size, and k denotes the time-domain sample index. That is, the timing metric value is determined over the M-ary frames per time-domain sample.

The frame location corresponding to the maximum timing metric value is estimated based on Equation 10.

$$\hat{k} = \underset{k \in \Omega}{\operatorname{argmax}} |c_{\text{timing}}(k)|$$ [Eqn. 10]

In Equation 10, $\Omega = \{0, \ldots, K_{th}-1, N_{\text{fft}}-K_{th}, \ldots, N_{\text{fft}}-1\}$, and $K_{th}$ is a constant value. According to the estimated $\hat{k}$, the second time offset value is estimated based on Equation 11.

$$\hat{\tau} = \begin{cases} \hat{k}, & \text{if } \hat{k} \in \{0, \ldots, K_{th}-1\} \\ \hat{k} - N_{\text{fft}}, & \text{if } \hat{k} \in \{N_{\text{fft}}-K_{th}, \ldots, N_{\text{fft}}-1\} \end{cases}$$ [Eqn. 11]

In Equation 11, when the estimated $\hat{k}$ belongs to $\hat{k} \in \{0, \ldots, K_{th}-1\}$, the second time offset value is $\hat{k}$. When the estimated $\hat{k}$ belongs to $\hat{k} \in \{N_{\text{fft}}-K_{th}, \ldots, N_{\text{fft}}-1\}$, the second time offset value is $\hat{k}-N_{\text{fft}}$.

Using the receive signal corresponding to the estimated $\hat{k}$ location, the metric value for the third frequency offset estimation is generated based on Equation 12 and Equation 13.

$$c_{\text{freq}}(i) = \sum_{m=0}^{M-1} (y^*_{m,0,k} \cdot y_{m,1,k}), i=1, \ldots, N_{\text{map}}$$ [Eqn. 12]

In Equation 12, $y_{m,0,k}$ denotes the time-domain preamble signal converted using the IFFT, $y_{m,i,k}$ denotes the time-domain pilot signal converted using the IFFT, m denotes the frame index, $N_{\text{map}}$ denotes the number of the OFDM symbols in the MAP interval, and k denotes the time-domain sample index. That is, the metric value is determined using the correlation between the pilot signal $y_{m,i,k}$ and the preamble signal $y_{m,0,k}$.

Using the generated metric $c_{\text{freq}}(1), \ldots, c_{\text{freq}}(N_{\text{map}})$, the third frequency offset is estimated based on Equation 13.

$$\hat{f}_o = \frac{1}{N_{map} \sum_{i=1}^{N_{map}} i^2} \sum_{i=1}^{N_{map}} \frac{N_{fft}}{N_{fft} + N_{cp}} \frac{i}{2\pi} \text{angle}(c_{freq}(i)) \quad \text{[Eqn. 13]}$$

In Equation 13, m denotes the frame index, $N_{fft}$ denotes the FFT size, $N_{map}$ denotes the number of the OFDM symbols in the MAP interval, and $N_{cp}$ denotes the CP length.

Figure 3:
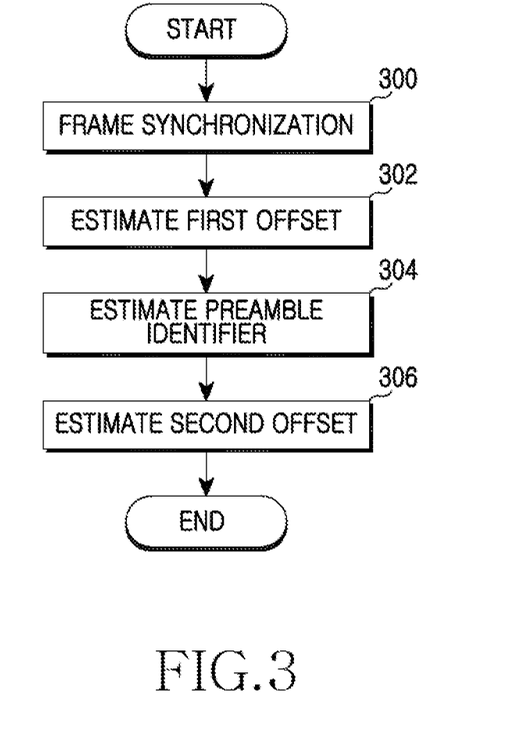
FIG. 3 is a flowchart of a method for acquiring initial synchronization when the receive signal is weak in an OFDM based wireless communication system according to an exemplary embodiment of the present invention.

FIG. 3 is a flowchart of a method for acquiring initial synchronization when a receive signal is weak in an OFDM based wireless communication system according to an exemplary embodiment of the present invention.

Referring to FIG. 3, in step 300, by using a feature that a preamble signal in a receive signal $r_i$ that is repeated in the time domain, a frame synchronizer 100 estimates an approximate frame synchronization.

In step 302, by using a CP length with respect to the receive signal roughly frame-synchronized by the frame synchronizer 100, a first offset estimator 102 estimates a first time offset and a first frequency offset corresponding to a fractional multiple of a subcarrier spacing.

More specifically, the first offset estimator 102 determines a metric value to estimate the synchronization based on Equation 1, using a correlation between a receive signal and a receive signal delayed by an FFT size in the time domain. Thus, the first offset estimator 102 estimates the first time offset and the first frequency offset.

In step 304, by shifting the receive signal interpolated with the first time offset and the first frequency offset by the subcarrier spacing, a preamble identifier estimator 106 estimates a second frequency offset corresponding to an integral multiple of the subcarrier spacing, extracts a preamble code from the preamble signal of the interpolated receive signal, and estimates the preamble identifier corresponding to the preamble code. Meanwhile, the first offset estimator 102 estimates the time offset and the frequency offset using the CP signal similar to the conventional method. While the conventional method accurately estimate the time offset and the frequency offset meeting the requirements, an exemplary embodiment of the present invention estimates the time offset and the frequency offset in order to operate the preamble identifier estimator 106.

In step 306, a second offset estimator 110 estimates a second time offset and a third frequency offset by derandomizing the receive signal interpolated with the first time offset, the first frequency offset, and the second frequency offset. The derandomization is fulfilled by multiplying the receive signal corrected in the frequency domain by a first preamble signal or a first pilot signal based on Equation 6 and Equation 7.

Figure 4:
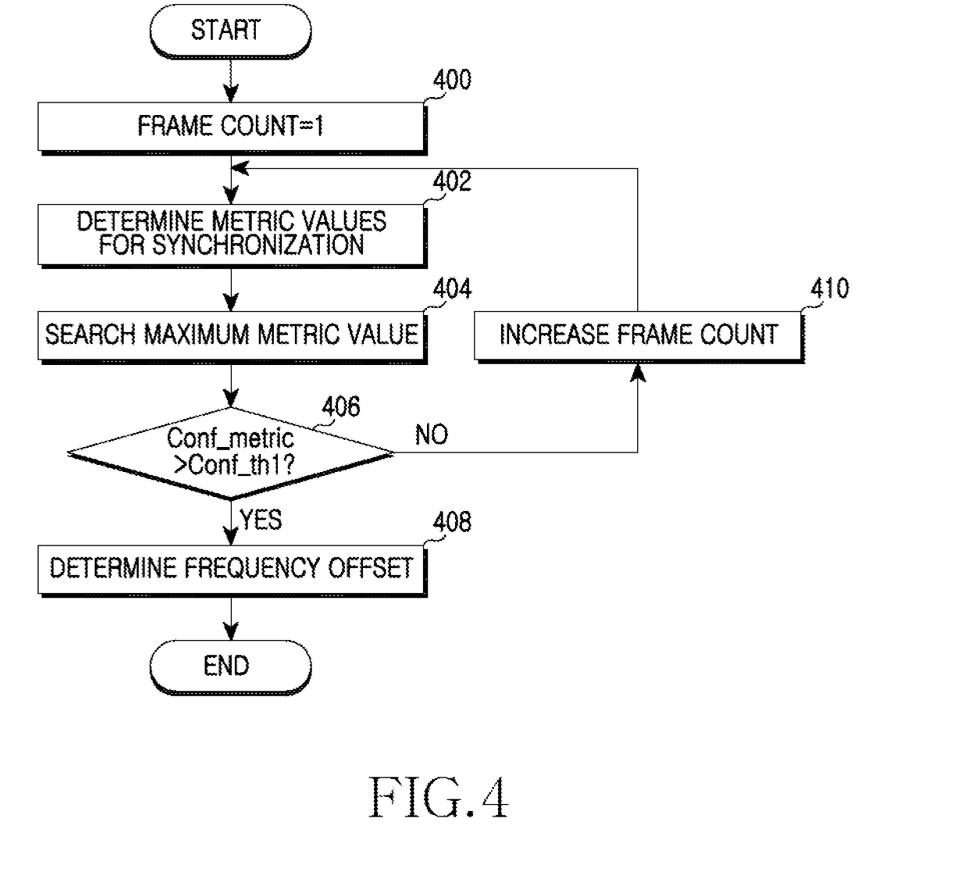
FIG. 4 is a detailed flowchart of a first offset estimator in FIG. 1 according to an exemplary embodiment of the present invention.

FIG. 4 is a detailed flowchart of a first offset estimator in FIG. 1 according to an exemplary embodiment of the present invention.

Referring to FIG. 4, the first offset estimator 102 sets a frame count to 1 in step 400. In step 402, the first offset estimator 102 determines a metric value for synchronization of Equation 1 according to the frame count value.

In step 404, the first offset estimator 102 searches for a maximum metric value among $N_{sym}$-ary metric values.

In step 406, when the metric value of the estimated location meets Equation 4, the first offset estimator 102 determines the first time offset corresponding to the maximum metric value of the $N_{sym}$-ary metric values and the first frequency offset corresponding to the first time offset in step 408.

In step 406, when the metric value of the estimated location does not meet Equation 4, the first offset estimator 102 increases the frame count value in step 410 and repeats steps 402, 404 and 406.

Figure 5:
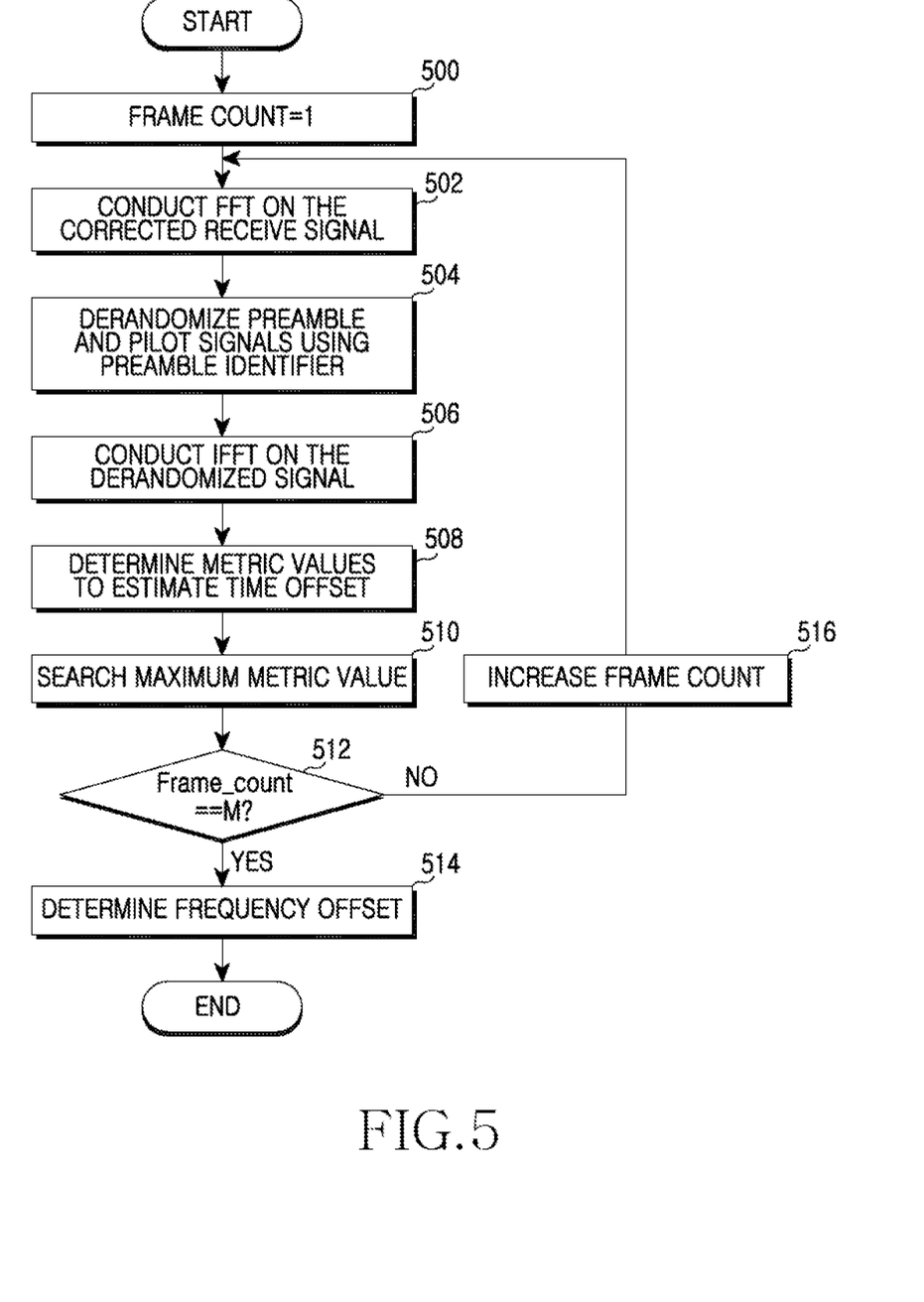
FIG. 5 is a detailed flowchart of a second offset estimator in FIG. 1 according to an exemplary embodiment of the present invention.

FIG. 5 is a detailed flowchart of a second offset estimator in FIG. 1 according to an exemplary embodiment of the present invention.

Referring to FIG. 5, the second offset estimator 110 sets a frame count to 1 in step 500, and conducts an FFT operation on a receive signal interpolated with a first time offset, a first frequency offset, and a second frequency offset in step 502.

In step 504, the second offset estimator 110 generates a preamble signal and a pilot signal in the frequency domain using a preamble identifier estimated according to a frame count value. The second offset estimator 110 then derandomizes by multiplying the interpolated receive signal by the preamble signal and the pilot signal.

In step 506, the second offset estimator 110 applies an IFFT to the derandomized preamble signal and pilot signal. By IFFT-converting the derandomized preamble signal and the pilot signal, signal components spread over the OFDM symbol interval are concentrated to samples of a multipath channel in the time domain. Using the receive signal in the region of the multipath, the time offset and the frequency offset may be estimated efficiently. Thus, the receive signal of a low SNR may be converted to the receive signal of a high SNR.

The second offset estimator 110 determines the metric value for the time offset estimation based on Equation 10 in step 508, and searches the maximum metric value based on Equation 10 in step 510.

In step 512, when the frame count value is equal to or greater than M, the second offset estimator 110 determines a second time offset corresponding to the maximum metric value of the metric values and a third frequency offset corresponding to the second time offset in step 514 (see Equation 12 and Equation 13).

In step 512, when the frame count value is less than M, the second offset estimator 110 increases the frame count value in step 516 and then repeats steps 502 through 512.

As set forth above, to acquire an initial synchronization under a weak signal environment in an OFDM based wireless communication system, a preamble signal and a pilot signal are derandomized and used to synchronize the preamble signal and the pilot signal. Therefore, an initial synchronization acquisition time with a low SNR can be reduced. By reducing the initial synchronization acquisition time, waste of time resources can be minimized.

While the invention has been shown and described with reference to certain exemplary embodiment thereof, it will be understood by those skilled in the art that various changes in form and details may be made therein without departing from the spirit and scope of the invention as defined by the appended claims and their equivalents.

What is claimed is:

1. An apparatus for acquiring initial synchronization in a wireless communication system based on Orthogonal Frequency Division Multiplexing (OFDM), the apparatus comprising:

a frame synchronizer for acquiring frame synchronization;

a first offset determiner for determining a first time offset and a first frequency offset based on the frame synchronization;

a preamble identifier estimator for estimating a preamble identifier in a receive signal interpolated with the first time offset and the first frequency offset; and a second offset determiner for obtaining a derandomized preamble signal and a derandomized pilot signal by generating a first preamble signal and a first pilot signal corresponding to the preamble identifier, and for determining a second time offset and a second frequency offset based on the derandomized preamble signal and the derandomized pilot signal.

2. The apparatus of claim 1, wherein the first offset determiner determines the first time offset and the first frequency offset by determining a first metric value during a plurality of frame intervals until the following equation is satisfied:

$$\text{Conf\_metric} = \frac{|c_i(\hat{\tau})|^2}{\frac{1}{|\Omega_n|}\sum_{k\in\Omega_n}|c_i(k)|^2} \geq \text{Conf\_th1}, \Omega_n$$

$$= \left\{ -\frac{N_{sym}}{2}, \ldots, n - N_{cp}, n + N_{cp}, \ldots, \frac{N_{sym}}{2} - 1 \right\}$$

where $c_i(\hat{\tau})$ denotes a maximum metric value among $N_{sym}$-ary average metric values during i-ary frames, $c_i(k)$ denotes a metric value corresponding to a k-th sample value of the i-ary frames, Conf_th1 denotes a threshold for determining whether to operate the first offset determiner, $|\Omega_n|$ denotes the number of elements of $\Omega_n$, $N_{cp}$ denotes a Cyclic Prefix (CP) length, $N_{fft}$ denotes a Fast Fourier Transform (FFT) size, and $N_{sym}=N_{cp}+N_{fft}$ is satisfied, and wherein the metric values are estimated using the correlation between the receive signal and a receive signal delayed by the FFT size.

3. The apparatus of claim 1, wherein the second offset determiner comprises:

a Fast Fourier Transform (FFT) unit for conducting an FFT operation on the receive signal and extracting a second preamble signal and a second pilot signal from the receive signal;

a randomizer for derandomizing in a frequency domain by multiplying the first preamble signal by the second preamble signal and multiplying the first pilot signal by the second pilot signal;

an Inverse FFT (IFFT) unit for conducting an IFFT operation on the derandomized preamble signal and the derandomized pilot signal; and an offset determiner for determining the second time offset and the second frequency offset by determining a timing metric value with respect to the derandomized preamble signal and the derandomized pilot signal converted to a time domain signal through the IFFT operation.

4. The apparatus of claim 3, wherein the timing metric value is determined based on the following equation:

$$c_{timing}(k) = \sum_{m=0}^{M-1} |y_{m,0,k}|^2, k = 0, \ldots, N_{fft} - 1$$

where $y_{m,0,k}$ denotes the time-domain preamble signal converted through the IFFT operation, m denotes a frame index, $N_{fft}$ denotes the Fast Fourier Transform (FFT) size, and k denotes the time-domain sample index, wherein a frame location corresponding to the maximum value of the timing metric value is estimated based on the following equation:

$$\hat{k} = \underset{k=\Omega}{\operatorname{argmax}} |c_{timing}(k)|$$

where $\Omega=\{0, \ldots, K_{th}-1, N_{fft}-K_{th}, \ldots, N_{fft}-1\}$, and $K_{th}$ is a constant value, and wherein a value of the second time offset is estimated based on the following equation according to the estimated $\hat{k}$:

$$\hat{\tau} = \begin{cases} \hat{k}, & \text{if } \hat{k} \in \{0, \ldots, K_{th}-1\} \\ \hat{k} - N_{fft}, & \text{if } \hat{k} \in \{N_{fft}-K_{th}, \ldots, N_{fft}-1\} \end{cases}$$

where the value of the second time offset is $\hat{k}$ when the estimated $\hat{k}$ belongs to $\hat{k} \in \{0, \ldots, K_{th}-1\}$, and the second time offset value is $\hat{k}-N_{fft}$ when the estimated $\hat{k}$ belongs to $\hat{k} \in \{N_{fft}-K_{th}, \ldots, N_{fft}-1\}$.

5. The apparatus of claim 4, wherein the metric value for estimating the second frequency offset is determined using the receive signal corresponding to the estimated k location based on the following equations:

$$c_{freq}(i) = \sum_{m=0}^{M-1} (y_{m,0,k}^* \cdot y_{m,1,k}), i = 1, \ldots, N_{map}$$

where $y_{m,0,k}$ denotes the time-domain preamble signal converted through the IFFT operation, $y_{m,1,k}$ denotes the time-domain pilot signal converted through the IFFT operation, m denotes the frame index, $N_{map}$ denotes the number of OFDM symbols in a MAP interval, and k denotes a subcarrier index, and wherein using the generated metric value $c_{freq}(1), \ldots, c_{freq}(N_{map})$, the second frequency offset is estimated based on the following equation:

$$\hat{f}_o = \frac{1}{N_{map}} \sum_{i=1}^{N_{map}} \frac{N_{fft}}{N_{fft}+N_{cp}} \frac{i}{2\pi} \text{angle}(c_{freq}(i))$$

where m denotes the frame index, $N_{fft}$ denotes the FFT size, k denotes the subcarrier index, $N_{map}$ denotes the number of the OFDM symbols in the MAP interval, and $N_{cp}$ denotes the CP length.

6. The apparatus of claim 3, wherein the second pilot signal comprises a pilot signal in a MAP interval received after the second preamble signal.

7. The apparatus of claim 3, wherein the derandomized preamble signal and the derandomized pilot signal converted to the time domain through the IFFT operation comprises an impulse signal delayed by a time offset.

8. The apparatus of claim 1, wherein the preamble identifier estimator extracts the preamble identifier corresponding to the preamble code contained in the interpolated receive signal.

9. The apparatus of claim 1, wherein the preamble identifier estimator estimates an extra frequency offset as an integral multiple of a subcarrier spacing and corrects the receive signal using the extra frequency offset, the second offset determiner obtains the derandomized preamble signal and the derandomized pilot signal based on the corrected receive signal.

10. A method for acquiring initial synchronization in a wireless communication system based on Orthogonal Frequency Division Multiplexing (OFDM), the method comprising:

acquiring frame synchronization;
determining a first time offset and a first frequency offset based on the frame synchronization;
estimating a preamble identifier in a receive signal interpolated with the first time offset and the first frequency offset;
obtaining a derandomized preamble signal and a derandomized pilot signal by generating a first preamble signal and a first pilot signal corresponding to the preamble identifier; and
determining a second time offset and a second frequency offset based on the derandomized preamble signal and the derandomized pilot signal.

11. The method of claim 10, wherein the determining of the first time offset and the first frequency offset comprises determining the first time offset and the first frequency offset by determining a first metric value during a plurality of frame intervals until the following equation is satisfied:

$$\text{Conf\_metric} = \frac{|c_i(\hat{\tau})|^2}{\frac{1}{|\Omega_n|}\sum_{k\in\Omega_n}|c_i(k)|^2} \geq \text{Conf\_th1}, \Omega_n$$

$$= \left\{ -\frac{N_{sym}}{2}, \ldots, n-N_{cp}, n+N_{cp}, \ldots, \frac{N_{sym}}{2}-1 \right\}$$

where $c_i(\hat{\tau})$ denotes a maximum metric value among $N_{sym}$-ary average metric values during i-ary frames, $c_i(k)$ denotes a metric value corresponding to a k-th sample value of the i-ary frames, Conf_th1 denotes a threshold for determining whether to operate a first offset estimator, $|\Omega_n|$ denotes the number of elements of $\Omega_n$, $N_{cp}$ denotes a Cyclic Prefix (CP) length, $N_{fft}$ denotes a Fast Fourier Transform (FFT) size, and $N_{sym}=N_{cp}+N_{fft}$ is satisfied, and wherein the metric values are estimated using the correlation between the receive signal and a receive signal delayed by the FFT size.

12. The method of claim 10, wherein the obtaining the derandomized preamble signal and the derandomized pilot signal comprises:

conducting a Fast Fourier Transform (FFT) operation on the receive signal;
extracting a second preamble signal and a second pilot signal from the receive signal; and
derandomizing by multiplying the first preamble signal by the second preamble signal and multiplying the first pilot signal by the second pilot signal in a frequency domain; and
wherein the determining of the second time offset and the second frequency offset comprises:
conducting an Inverse FFT (IFFT) operation on the derandomized preamble signal and the derandomized pilot signal; and
determining the second time offset and the second frequency offset by determining a timing metric value with respect to the derandomized preamble signal and the derandomized pilot signal converted to a time domain signal through the IFFT operation.

13. The method of claim 12, wherein the timing metric value is determined based on the following equation:

$$c_{timing}(k) = \sum_{m=0}^{M-1}|y_{m,0,k}|^2,$$

$$k = 0, \ldots, N_{fft}-1$$

where $y_{m,0,k}$ denotes the time-domain preamble signal converted through the IFFT, m denotes a frame index, $N_{fft}$ denotes the FFT size, and k denotes the time-domain sample index, a frame location corresponding to the maximum value of the timing metric value is estimated based on the following equation:

$$\hat{k} = \underset{k=\Omega}{\text{argmax}}|c_{timing}(k)|$$

where $\Omega = \{0, \ldots, K_{th}-1, N_{fft}-K_{th}, \ldots, N_{fft}-1\}$, and $K_{th}$ is a constant value, and a value of the second time offset is estimated based on the following equation according to the estimated $\hat{k}$:

$$\hat{\tau} = \begin{cases} \hat{k}, & \text{if } \hat{k} \in \{0, \ldots, K_{th}-1\} \\ \hat{k}-N_{fft}, & \text{if } \hat{k} \in \{N_{fft}-K_{th}, \ldots, N_{fft}-1\} \end{cases}$$

where the value of the second time offset is $\hat{k}$ when the estimated $\hat{k}$ belongs to $\hat{k} \in \{0, \ldots, K_{th}-1\}$, and the second time offset value is $\hat{k}-N_{fft}$ when the estimated $\hat{k}$ belongs to $\hat{k} \in \{N_{fft}-K_{th}, \ldots, N_{fft}-1\}$.

14. The method of claim 13, wherein the metric value for estimating the second frequency offset is determined using the receive signal corresponding to the estimated $\hat{k}$ location based on the following equation:

$$c_{freq}(i) = \sum_{m=0}^{M-1}(y^*_{m,0,k} \cdot y_{m,1,k}),$$

$$i = 1, \ldots, N_{map}$$

where $y_{m,0,k}$ denotes the time-domain preamble signal converted through the IFFT operation, $y_{m,l,k}$ denotes the time-domain pilot signal converted through the IFFT operation, m denotes the frame index, $N_{map}$ denotes the number of OFDM symbols in a MAP interval, and k denotes a subcarrier index, and wherein using the generated metric value $c_{freq}(1), \ldots, c_{freq}(N_{map})$, the second frequency offset is estimated based on the following equation:

$$\hat{f}_o = \frac{1}{\sum_{i=1}^{N_{map}}i^2}\sum_{i=1}^{N_{map}}\frac{N_{fft}}{N_{fft}+N_{cp}}\frac{i}{2\pi}\text{angle}(c_{freq}(i))$$

where m denotes the frame index, $N_{fft}$ denotes the FFT size, k denotes the time-domain sample index, $N_{map}$ denotes the number of the OFDM symbols in the MAP interval, and $N_{cp}$ denotes the CP length.

15. The method of claim 12, wherein the second pilot signal comprises a pilot signal in the MAP interval received after the second preamble signal.

16. The method of claim 12, wherein the derandomized preamble signal and the dreandomized pilot signal converted to the time domain through the IFFT operation comprises an impulse signal delayed by a time offset.

17. The method of claim 10, wherein the preamble identifier is extracted using a preamble code contained in the interpolated receive signal.

18. The method of claim 10 further comprising:
estimating an extra frequency offset as an integral multiple of a subcarrier spacing; and
correcting the receive signal using the extra frequency offset,
wherein the obtaining of the derandomized preamble signal and the derandomized pilot signal comprises obtaining of the derandomized preamble signal and the derandomized pilot signal based on the corrected receive signal.

19. An apparatus for acquiring initial synchronization in a wireless communication system based on Orthogonal Frequency Division Multiplexing (OFDM), the apparatus comprising:
a preamble identifier estimator for extracting a preamble code from a second preamble signal contained in a receive signal and for estimating a preamble identifier corresponding to the preamble code;
a randomizer for generating a first preamble signal and a first pilot signal using the estimated preamble identifier, for extracting the second preamble signal and a second pilot signal of the receive signal, and for derandomizing a preamble signal by multiplying the first preamble signal by the second preamble signal and for derandomizing a pilot signal by multiplying the first pilot signal and the second pilot signal in a frequency domain; and
an offset determiner for determining a time offset and a frequency offset by determining a timing metric value using the derandomized preamble signal and the derandomized pilot signal in a time domain by applying an Inverse Fast Fourier Transform (IFFT) operation to the derandomized preamble signal and the derandomized pilot signal.

20. The apparatus of claim 19, wherein the timing metric value is determined based on the following equation:

$$c_{timing}(k) = \sum_{m=0}^{M-1} |y_{m,0,k}|^2,$$

$$k = 0, \ldots, N_{fft} - 1$$

where $y_{m,0,k}$ denotes the time-domain preamble signal converted through the IFFT, m denotes a frame index, $N_{fft}$ denotes an FFT size, and k denotes the time-domain sample index,
wherein a frame location corresponding to a maximum value of the timing metric value is estimated based on the following equation:

$$\hat{k} = \underset{k=\Omega}{\mathrm{argmax}} |c_{timing}(k)|$$

where $\Omega = \{0, \ldots, K_{th}-1, N_{fft}-K_{th}, \ldots, N_{fft}-1\}$, and $K_{th}$ is a constant value, and
wherein a value of the second time offset is estimated based on the following equation according to the estimated $\hat{k}$:

$$\hat{\tau} = \begin{cases} \hat{k}, & \text{if } \hat{k} \in \{0, \ldots, K_{th}-1\} \\ \hat{k} - N_{fft}, & \text{if } \hat{k} \in \{N_{fft} - K_{th}, \ldots, N_{fft}-1\} \end{cases}$$

where the value of the time offset is $\hat{k}$ when the estimated $\hat{k}$ belongs to $\hat{k} \in \{0, \ldots, K_{th}-1\}$, and the second time offset value is $\hat{k} - N_{fft}$ when the estimated $\hat{k}$ belongs to $\hat{k} \in \{N_{fft}-K_{th}, \ldots, N_{fft}-1\}$.

21. The apparatus of claim 20, wherein the metric value for estimating the frequency offset is determined using the receive signal corresponding to the estimated k location based on the following equation:

$$c_{freq}(i) = \sum_{m=0}^{M-1} (y^*_{m,0,k} \cdot y_{m,1,k}),$$

$$i = 1, \ldots, N_{map}$$

where $y_{m,0,k}$ denotes the time-domain preamble signal converted through the IFFT operation, $y_{m,1,k}$ denotes the time-domain pilot signal converted through the IFFT operation, m denotes the frame index, $N_{map}$ denotes a number of OFDM symbols in a MAP interval, and k denotes the time-domain sample index, and
wherein using the generated metric value $c_{freq}(1), \ldots, c_{freq}(N_{map})$, the third frequency offset is estimated based on the following equation:

$$\hat{f}_o = \frac{1}{N_{map}} \sum_{i=1}^{N_{map}} \frac{N_{fft}}{N_{fft}+N_{cp}} \frac{i}{2\pi} \mathrm{angle}(c_{freq}(i))$$

where m denotes the frame index, $N_{fft}$ denotes the FFT size, k denotes the time-domain sample index, $N_{map}$ denotes the number of the OFDM symbols in the MAP interval, and $N_{cp}$ denotes a Cyclic Prefix (CP) length.

22. The apparatus of claim 19, wherein the second pilot signal comprises a pilot signal in the MAP interval received after the second preamble signal.

23. The apparatus of claim 19, wherein the derandomized preamble signal and the derandomized pilot signal converted to a time domain signal through the IFFT operation comprises an impulse signal delayed by the time offset.

24. The apparatus of claim 19, wherein the preamble identifier estimator estimates an extra frequency offset as an integral multiple of a subcarrier spacing and corrects the receive signal using the extra frequency offset,
the randomizer extracts the second preamble signal and the second pilot signal of the corrected receive signal.

25. A method for acquiring initial synchronization in a wireless communication system based on Orthogonal Frequency Division Multiplexing (OFDM), the method comprising:

extracting a preamble code from a second preamble signal contained in a receive signal;

estimating a preamble identifier corresponding to the preamble code;

generating a first preamble signal and a first pilot signal using the estimated preamble identifier, extracting the second preamble signal and a second pilot signal of the receive signal, derandomizing a preamble signal by multiplying the first preamble signal by the second preamble signal and derandomizing a pilot signal by multiplying the first pilot signal and the second pilot signal in a frequency domain; and determining a time offset and a first frequency offset by determining a timing metric value using the derandomized preamble signal and the derandomized pilot signal in a time domain by applying an Inverse Fast Fourier Transform (IFFT) operation to the derandomized preamble signal and the derandomized pilot signal.

26. The method of claim 25, wherein the timing metric value is determined based on the following equation:

$$c_{timing}(k) = \sum_{m=0}^{M-1} |y_{m,0,k}|^2,$$

$$k = 0, \ldots, N_{fft} - 1$$

where $y_{m,0,k}$ denotes the time-domain preamble signal converted through the IFFT operation, m denotes a frame index, $N_{fft}$ denotes an FFT size, and k denotes the time-domain sample index, wherein a frame location corresponding to a maximum value of the timing metric value is estimated based on the following equation:

$$\hat{k} = \underset{k=\Omega}{\mathrm{argmax}} |c_{timing}(k)|$$

where $\Omega = \{0, \ldots, K_{th}-1, N_{fft}-K_{th}, \ldots, N_{fft}-1\}$, and $K_{th}$ is a constant value, and wherein a value of the second time offset is estimated based on the following equation according to the estimated $\hat{k}$:

$$\hat{\tau} = \begin{cases} \hat{k}, & \text{if } \hat{k} \in \{0, \ldots, K_{th} - 1\} \\ \hat{k} - N_{fft}, & \text{if } \hat{k} \in \{N_{fft} - K_{th}, \ldots, N_{fft} - 1\} \end{cases}$$

where the value of the time offset is $\hat{k}$ when the estimated $\hat{k}$ belongs to $\hat{k} \in \{0, \ldots, K_{th}-1\}$, and the second time offset value is $\hat{k}-N_{fft}$ when the estimated $\hat{k}$ belongs to $\hat{k} \in \{N_{fft}-K_{th}, \ldots, N_{fft}-1\}$.

27. The method of claim 26, wherein the metric value for generating the first frequency offset is determined using the receive signal corresponding to the estimated $\hat{k}$ location based on the following equation:

$$c_{freq}(i) = \sum_{m=0}^{M-1} (y^*_{m,0,k} \cdot y_{m,1,k}),$$

$$i = 1, \ldots, N_{map}$$

where $y_{m,0,k}$ denotes the time-domain preamble signal converted through the IFFT operation, $y_{m,1,k}$ denotes the time-domain pilot signal converted through the IFFT operation, m denotes the frame index, $N_{map}$ denotes a number of OFDM symbols in a MAP interval, and k denotes the time-domain sample index, and wherein using the generated metric value $c_{freq}(1), \ldots, c_{freq}(N_{map})$, the first frequency offset is estimated based on the following equation:

$$\hat{f}_o = \frac{1}{\sum_{i=1}^{N_{map}} i^2} \sum_{i=1}^{N_{map}} \frac{N_{fft}}{N_{fft}+N_{cp}} \frac{i}{2\pi} \mathrm{angle}(c_{freq}(i))$$

where m denotes the frame index, $N_{fft}$ denotes the FFT size, k denotes the time-domain sample index, $N_{map}$ denotes the number of the OFDM symbols in the MAP interval, and $N_{cp}$ denotes a Cyclic Prefix (CP) length.

28. The method of claim 25, wherein the second pilot signal comprises a pilot signal in the MAP interval received after the second preamble signal.

29. The method of claim 25, wherein the derandomized preamble signal and the derandomized pilot signal converted to the time domain through the IFFT operation comprises an impulse signal delayed by a time offset.

30. The method of claim 25, further comprising:

estimating an extra frequency offset as an integral multiple of a subcarrier spacing; and correcting the receive signal using the extra frequency offset, wherein the second preamble signal and the second pilot signal are extracted from the corrected receive signal.

* * * * *